Patented Jan. 21, 1941

2,229,616

UNITED STATES PATENT OFFICE 2,229,616

FINISHING SYSTEM FOR POROUS SURFACES

Herbert L. Wampner, Terre Haute, Ind., assignor to Commercial Solvents Corporation, Terre Haute, Ind., a corporation of Maryland No Drawing. Application September 17, 1937, Serial No. 164,333

5 Claims. (Cl. 91—68)

My invention relates to finishing systems for porous surfaces, and particularly to coating compositions adapted for sealing such surfaces.

In finishing porous surfaces the first coats of a finishing material sink into the base, thus requiring an excessive amount of the coating composition to secure a satisfactory finish. Numerous types of sealers have been recommended in the past as undercoats for finishing such surfaces, and some of these materials have been relatively satisfactory on surfaces such as plaster having a well troweled lime putty surface. However, numerous surfaces, particularly of other architectural materials, are much more porous than such a plaster, and in finishing such surfaces considerable difficulty has been encountered in attempting to secure complete sealing with one or even two applications of the undercoat. Thus, in finishing very porous plaster, wall board, insulating board, and the like, it has been found that the surfaces are so porous, and contain such large interstices, as to require a number of coats of sealing material in order to secure a uniform surface.

I have now discovered that a very satisfactory sealing action on such surfaces may be secured by employing as the sealer a coating composition prepared from a film-forming material and volatile solvents and having the property of gelling after evaporation of a portion of the solvents. In accordance with this procedure the sealer gels shortly after application and before it is able to flow from the outer openings of the pores or interstices into the base. In this manner extremely porous surfaces may be sealed by the application of fewer coats of sealing material and usually by the application of a single coat of the sealer.

In preparing the sealer in accordance with the present invention any combination of film-forming material and volatile solvent may be employed which will give rise to the property of gelling after evaporation of a portion of the solvent mixture. It is well known in the art that the various types of film-forming materials, such as cellulose derivatives, synthetic resins, chlorinated rubber, etc., may be incorporated in volatile solvents and that these materials will gel in the presence of a sufficient quantity of a non-solvent. Thus, in the case of the cellulose derivatives all of the active solvents have limited tolerances for the latent solvents or diluents, and by choosing the proper type and proportion of the latter so that this portion of the solvent mixture will evaporate from the composition more slowly than the active solvent, it is possible to secure a coating material which will constitute initially a clear solution but which will gel during evaporation of the solvent mixture. Similar results may be secured with other film-forming materials by the proper formulation of a solvent mixture containing both solvents and non-solvents.

In order to secure the greatest sealing action, it is desirable that the gelling take place as soon as possible after application of the sealer coat. It is possible to formulate these materials so that gelling will take place at any given stage in the evaporation even to the point of gelling prior to striking the surface in spray application of the material. However, if gelling takes place before any flow is secured the adherence of the sealer coat will be somewhat impaired, and it is therefore desirable to employ a composition having a somewhat delayed gelling.

The optimum solvent composition from the standpoint of securing gelling at the desired time, of course, will depend upon the type of solvent to be employed and upon the method of application of the sealer coat. The gelling time will depend upon the relative amounts of solvent and non-solvent, their evaporation rates, and the presence or absence of constant-evaporating mixtures. In the case of sealers for spray application, relatively rapidly evaporating solvents and non-solvents will be employed, and in the case of sealers for brush application slower evaporating materials will be used. However, in both cases the time of gelling may be fixed by proper choice of the materials and their relative proportions. Examples of various solvent mixtures are illustrated below, and in any given case one skilled in the art may readily determine the optimum solvent composition by preliminary experiments.

In addition to the film-forming material, the solvent and non-solvent, the sealers may contain other normal constituents of such compositions, e. g., plasticizers, resins, dyes, pigments, and the like. For the less rigid types of base materials it will be desirable to employ a plasticizer, and for this purpose it is preferred to utilize a non-solvent plasticizer in order not to interfere with the gelling action. Resins are not necessary in the composition but may be employed if desired. Dyes or pigments may be employed and a properly pigmented sealer will, of course, facilitate adequate covering by the final finishing coating material.

The sealers of my invention may be applied in the usual manner as, for example, by spraying or brushing, and suitable formulation of the liquid portion of the sealer will enable it to be applied by any of the usual procedures. After the sealer has dried any of the common coating materials may be applied as the final finish. Among these may be mentioned paints, varnishes, enamels, lacquers, shellac, and the like. It is preferable, however, that the finishing material does not contain solvents for the gelled film-forming material of the sealer, or at least does not contain slowly evaporating solvents which would attack the sealer and enable it to flow and thus sink into the base during the drying of the finish coat. From this standpoint, it may be seen that practically any of the types of sealer compositions may be utilized as undercoats for paints, oleoresinous varnishes, or enamels, but that for most satisfactory results under lacquers, spirit varnishes, and shellacs, sealers should be selected in which the gelled film-forming material of the sealer is not attacked by the solvents of the former types of finishes. In view of the number of possible combinations of sealer and finish materials, one skilled in the art may readily select a combination in which there is minimum attack upon the sealer by the finishing material.

My invention may be illustrated by the following specific examples:

EXAMPLE I

*Sealer for spray application as undercoat for paint, varnish, enamel, or shellac*

| | Parts by weight |
|---|---|
| Nitrocellulose (5 sec.) | 10 |
| Raw castor oil | 10 |

Incorporated in 100 parts by weight of the following solvent mixture:

| | Per cent by volume |
|---|---|
| Ethyl acetate | 10 |
| Ethyl alcohol | 20 |
| Butyl alcohol | 10 |
| Toluol | 60 |

EXAMPLE II

*Sealer for brush application as undercoat for paint, varnish, enamel, or shellac*

| | Parts by weight |
|---|---|
| Nitrocellulose (½ sec.) | 12 |
| Raw castor oil | 12 |
| Titanium dioxide | 10 |

Incorporated in 100 parts by weight of the following solvent mixture:

| | Per cent by volume |
|---|---|
| Ethyl propionate | 10 |
| Butyl alcohol | 30 |
| Xylol | 60 |

EXAMPLE III

*Sealer for spray application as undercoat for nitrocellulose lacquer*

| | Parts by weight |
|---|---|
| Cellulose acetate (38–39 acetyl no.; 2 sec. viscosity) | 15 |
| Dibutyl phthalate | 4 |

Incorporated in 100 parts by weight of the following solvent mixture:

| | Per cent by volume |
|---|---|
| Acetone | 40 |
| Ethyl alcohol | 30 |
| Toluol | 30 |

EXAMPLE IV

*Sealer for spray application as undercoat for paint, varnish, or enamel*

| | Parts by weight |
|---|---|
| Ethyl cellulose (20 cent.) | 10 |
| Raw castor oil | 3 |

Incorporated in 100 parts by weight of the following solvent mixture:

| | Per cent by volume |
|---|---|
| Ethyl alcohol | 15 |
| Toluol | 35 |
| Petroleum naphtha (boiling range 130–150° C.) | 50 |

EXAMPLE V

*Sealer for spray application as undercoat for paint, varnish, or enamel*

| | Parts by weight |
|---|---|
| Vinylite resin, type H (conjoint polymerization product of vinyl chloride and vinyl acetate) | 15 |

Incorporated in 100 parts by weight of the following solvent mixture:

| | Per cent by volume |
|---|---|
| Methylethylketone | 25 |
| Toluol | 75 |

EXAMPLE VI

*Sealer for spray application as undercoat for paints, varnish, enamel or shellac*

| | Parts by weight |
|---|---|
| Chlorinated rubber (Tornesit, 130 cent. viscosity) | 15 |
| Butyl stearate | 5 |

Incorporated in 100 parts by weight of the following solvent mixture:

| | Per cent by volume |
|---|---|
| Benzol | 35 |
| Toluol | 40 |
| Petroleum naphtha (boiling range 130–150° C.) | 25 |

It is to be understood, of course, that the above examples are merely illustrative and do not limit the scope of my invention. Film-forming materials other than those specified may be employed in the compositions if a suitable mixture of solvent and non-solvent is employed to impart the property of gelling after evaporation of a portion of the solvents. Various equivalent materials may also be substituted for the other ingredients of the sealer compositions, and the formulation may be varied in accordance with known practice in the art as long as the gelling property of the composition is provided for. The use of any such equivalents or modifications of procedure which would naturally occur to one skilled in the art is to be considered as within the scope of my invention.

My invention now having been described what I claim is:

1. A method for finishing a base having a porous surface, which comprises applying to said surface at least one coat of a sealer comprising a film-forming material and a mixture comprising a volatile organic solvent component and a volatile organic non-solvent component in such proportions as to constitute initially a solvent mixture for said film-forming material, said solvent component and non-solvent component having such relative evaporation rates as to cause said mixture to become a non-solvent for said film-forming material, and to cause said sealer to gell, after evaporation of a portion of said mixture and before the sealer is able to flow from the outer openings of the pores into the base, allowing said gelled sealer to dry, and applying to the sealed surface a finishing coating composition free from slowly evaporating solvents which could attack the gelled sealer sufficiently to cause it to flow and sink into the base during the drying of the finishing coat.

2. A method for finishing a base having a porous surface, which comprises applying to said surface at least one coat of a sealer comprising a film-forming cellulose derivative and a mixture comprising a volatile organic solvent component and a volatile organic non-solvent component in such proportions as to constitute initially a solvent mixture for said film-forming cellulose derivative, said solvent component and non-solvent component having such relative evaporation rates as to cause said mixture to become a non-solvent for said film-forming cellulose derivative, and to cause said sealer to gell, after evaporation of a portion of said mixture and before the sealer is able to flow from the outer openings of the pores into the base, allowing said gelled sealer to dry, and applying to the sealed surface a finishing coating composition free from slowly evaporating solvents which could attack the gelled sealer sufficiently to cause it to flow and sink into the base during the drying of the finishing coat.

3. A method for finishing a base having a porous surface, which comprises applying to said surface at least one coat of a sealer comprising a nitrocellulose and a mixture comprising a volatile organic solvent component and a volatile organic non-solvent component in such proportions as to constitute initially a solvent mixture for said nitrocellulose, said solvent component and non-solvent component having such relative evaporation rates as to cause said mixture to become a non-solvent for said nitrocellulose, and to cause said sealer to gell, after evaporation of a portion of said mixture and before the sealer is able to flow from the outer openings of the pores into the base, allowing said gelled sealer to dry, and applying to the sealed surface a finishing coating composition free from slowly evaporating solvents which could attack the gelled sealer sufficiently to cause it to flow and sink into the base during the drying of the finishing coat.

4. A method for finishing a base having a porous surface, which comprises applying to said surface at least one coat of a sealer comprising a film-forming synthetic resin and a mixture comprising a volatile organic solvent component and a volatile organic non-solvent component in such proportions as to constitute initially a solvent mixture for said film-forming synthetic resin, said solvent component and non-solvent component having such relative evaporation rates as to cause said mixture to become a non-solvent for said film-forming synthetic resin, and to cause said sealer to gell, after evaporation of a portion of said mixture and before the sealer is able to flow from the outer openings of the pores into the base, allowing said gelled sealer to dry, and applying to the sealed surface a finishing coating composition free from slowly evaporating solvents which could attack the gelled sealer sufficiently to cause it to flow and sink into the base during the drying of the finishing coat.

5. A method for finishing a base having a porous surface, which comprises applying to said surface at least one coat of a sealer comprising a film-forming chlorinated rubber derivative and a mixture comprising a volatile organic solvent component and a volatile organic non-solvent component in such proportions as to constitute initially a solvent mixture for said film-forming chlorinated rubber derivative, said solvent component and non-solvent component having such relative evaporation rates as to cause said mixture to become a non-solvent for said film-forming chlorinated rubber derivative, and to cause said sealer to gell, after evaporation of a portion of said mixture and before the sealer is able to flow from the outer openings of the pores into the base, allowing said gelled sealer to dry, and applying to the sealed surface a finishing coating composition free from slowly evaporating solvents which could attack the gelled sealer sufficiently to cause it to flow and sink into the base during the drying of the finishing coat.

HERBERT L. WAMPNER.